United States Patent
Zhou et al.

(10) Patent No.: US 6,586,480 B1
(45) Date of Patent: Jul. 1, 2003

(54) INTEGRATED PROCESS FOR THE PRODUCTION OF HYDROCARBON LIQUIDS AND AMMONIA

(75) Inventors: Peizheng Zhou, Lawrenceville, NJ (US); Yijun Lu, Lawrenceville, NJ (US); Michael Rueter, Plymouth Meeting, PA (US)

(73) Assignee: Hydrocarbon Technologies, Inc., Lawrenceville, NJ (US)

( * ) Notice: Subject to any disclaimer, the term of this patent is extended or adjusted under 35 U.S.C. 154(b) by 0 days.

(21) Appl. No.: 10/212,534

(22) Filed: Aug. 6, 2002

(51) Int. Cl.$^7$ .............................. C07C 27/00; C01C 1/04

(52) U.S. Cl. ....................... 518/700; 518/702; 518/703; 518/704; 423/359

(58) Field of Search ................................ 518/700, 702, 518/703, 704; 423/359

(56) References Cited

U.S. PATENT DOCUMENTS 6,248,794 B1 * 6/2001 Giekes ...................... 518/700

FOREIGN PATENT DOCUMENTS

WO          01/09038 A2 *  2/2001

* cited by examiner

*Primary Examiner*—J. Parsa
(74) *Attorney, Agent, or Firm*—Daniel M. Kennedy

(57) ABSTRACT

Process and economic advantages are achieved by the integration of a Fischer Tropsch process for hydrocarbon liquids production as a retrofit in an installation for the production of ammonia fertilizer from fossil fuel derived syngas. Utilization of most of the CO and part of the $H_2$ in the syngas stream during Fischer-Tropsch synthesis as the first step in the integrated process produces hydrocarbon products while the F-T effluent containing unreacted hydrogen gas at the necessary ratio of $H_2/N_2$ is used in the second step of ammonia synthesis. The overall product slate as appropriate for maximum economic performance of the installation is thus achieved.

10 Claims, No Drawings

INTEGRATED PROCESS FOR THE PRODUCTION OF HYDROCARBON LIQUIDS AND AMMONIA

FIELD OF THE INVENTION

The invention relates to the discovery of a process integration that interposes a hydrocarbon liquids production process between a fossil fuel-based synthesis gas production process and an ammonia production process in a manner that substantially improves the economics of the overall integrated process. The invention particularly relates to the discovery of a means to enhance the economic feasibility of relatively small scale, syngas based ammonia fertilizer production plants by the integration of compatible liquid hydrocarbon synthesis processes into the ammonia production plant complex utilizing a portion of the fossil fuel-based syngas production as a feedstream to the hydrocarbons production process

BACKGROUND OF THE INVENTION

The production of ammonia fertilizers by the reduction of nitrogen gas with hydrogen as derived from synthesis gas (syngas) is an established process, well known in the art. The process is of great importance to developed as well as developing countries with the population of ammonia fertilizer plants, both small and large, high in all cases. Typically, the required synthesis gas is produced by partial oxidation or steam reforming of fossil fuels such as coal or natural gas by processes well known and established in the art. When it is readily available, natural gas, of course, is by far the preferred syngas feedstock due to its higher hydrogen to carbon ratio, ease of transportation and cleanliness.

For those countries with an abundance of natural gas reserves, particularly those in the Middle East, the production and export of ammonia fertilizer is a major industry. Very large complexes of ammonia production based on natural gas derived syngas have been built there that enjoy all the economic process advantages attendant upon great plant size and large scale production. As an export commodity, the ammonia fertilizers they produce are exceedingly price competitive, beyond the means of the small, native ammonia plants of importing countries to match, even when their raw material is natural gas. However, the available fossil fuel for these countries is often coal. Ammonia produced from coal-derived syngas is appreciably more costly than an equivalent natural gas/syngas ammonia process. Consequently, the native ammonia fertilizer industry of those importing countries is threatened with native plant obsolescence and long-term dependence upon imported ammonia fertilizer. Hundreds of relatively small, coal-based native ammonia fertilizer plants lie threatened with closure in the face of import competition unless those small plant installations, can be altered to improve the overall plant economics of operation for ammonia production from coal over the economics of imported ammonia fertilizer produced from natural gas. Alternatively, methods need to be found to alter the product slate of the native coal derived syngas-to-ammonia plants to produce a new mix of products that will restore the economic justification for continued operation of coal-based ammonia fertilizer production plants.

There are a number of well known coal gasification processes for the production of nitrogen-containing synthesis gas such as water gas (WG) or semi-water gas (SWG) where the synthesis gas is employed as feedstreams to reactors for the reduction of nitrogen to ammonia. These feedstreams usually have hydrogen gas to carbon monoxide ratios ($H_2/CO$) in the range of 0.6 to 1.5. Typical of these are the Koppers-Totzek, Winkler and Lurgi processes. It is also well known in the art that these syngas processes can be readily modified to adjust the ratios of hydrogen to carbon monoxide in the product stream to provide a ratio that is more suitable for use in the downstream conversion processes of the installation or more compatible with the overall objectives of the product installation. For example, the desired end-product may be a high purity, high BTU SNG gas, a low BTU clean refinery gas, a syngas for methanol production, or, as in the present case, syngas for ammonia production. It is left to the artisan to determine the more preferred syngas process and/or modification of an installed process to meet the overall product goals of the installation and maximize coal utilization.

The problem addressed herein is the discovery of a process modification of small, coal-based syngas-to-ammonia plant installations that would restore the profitability of those plants in competition with imported ammonia costs and make the continued operation of those native plants both feasible and attractive. The specific objective of the instant invention is the realization of a process integration into a syngas-ammonia facility that can utilize a syngas with variable $H_2/CO$ ratios first as a feedstock to produce high value liquid hydrocarbons before ammonia production.

For ammonia plants with natural gas-derived syngas as feedstock, the invention as well provides an option of modifying the product slate from only ammonia to integrated fuels/ammonia co-production to cope with changing market demands and to improve plant economics

SUMMARY OF THE INVENTION

It has been discovered that the integration into a syngas-to-ammonia process installation of a Fischer-Tropsch process for the production of liquid hydrocarbons can be effectively achieved to both produce ammonia and a slate of liquid hydrocarbons at a substantial benefit to the overall economics of the integrated process. In particular, the process of the invention includes an integrated process for the production of ammonia-based fertilizer and liquid hydrocarbon products from fossil fuel derived synthesis gas by contacting the fossil fuel with steam and oxygen-containing gas under gasification conditions sufficient to produce a synthesis gas after desulfurization. The low sulfur content synthesis gas comprising nitrogen gas, hydrogen gas and carbon monoxide in a mole ratio of hydrogen to carbon monoxide of between 0.6 to 1 and 5 to 1 is directly passed to a catalytic synthesis process under conditions for the conversion of the carbon monoxide gas and a portion of the hydrogen gas to fuel products comprising substantially liquid hydrocarbon products and light hydrocarbon gaseous products.

The synthesis gas does not have to be processed in a water gas shift unit to convert CO into hydrogen as is normally practiced in ammonia plants since CO is not desirable in ammonia production. While CO is a major reactant for Fischer-Tropsch synthesis which essentially uses up the CO and leaves $N_2$ and part of $H_2$ for ammonia production downstream.

The liquid and gaseous hydrocarbon products and by-product $CO_2$, are separated from both the nitrogen gas and the unreacted portion of the hydrogen gas while the valuable hydrocarbon products are recovered. The nitrogen gas and the unreacted hydrogen gas are recovered as a feedstream to a process for the hydrogenation of the nitrogen whereby ammonia-based fertilizer is produced and recovered.

DETAILED DESCRIPTION OF THE INVENTION

The basic application of the present invention is the integration of a Fischer-Tropsch (F-T) unit into a fossil-fuell derived syngas-to-ammonia plant such that the synthesis gas (water-gas or semi-water gas) is first converted to liquid hydrocarbons before the production of ammonia by reduction of nitrogen ($N_2$) with the unreacted hydrogen gas effluent from the F-T unit. The water gas shift in the syngas reactor originally used to convert CO into hydrogen before ammonia synthesis is no longer necessary and can be eliminated. When the $H_2/CO$ molar ratio of the synthesis gas is 0.8–5.2 most of the CO and part of the $H_2$ in the feed gas are converted to hydrocarbon products in the F-T unit,The off-gas from the F-T system contains significant amounts of unconverted hydrogen, $N_2$ and a small amount of CO. These off-gases are converted to ammonia in a second step of the process in the now integrated fertilizer plant with appropriate $N_2$ balancing. The off gas from the F-T system also contains significant amounts of carbon dioxide ($CO_2$). The carbon dioxide can be used to produce ammonium bicarbonate or urea. Accordingly, the hydrogen gas, carbon monoxide and nitrogen in the feed water gas can be fully utilized.

The hydrocarbon products from the F-T synthesis are highly useful, very clean, straight chain liquid hydrocarbons containing no sulfur and nitrogen. They are useful as household fuels such as LPG, liquid transportation fuels such as naphtha comprising an extra clean gasoline component, and diesel fuels having a very high cetane number in the range of 75–80. The liquid hydrocarbons are also valuable chemical feed stocks. For example, naphtha is an excellent feed stock for ethylene production. The liquid hydrocarbons contain about 50 weight percent of alpha-olefins which are high-value chemicals and various grades of solvents can be made from n-alkanes. A small amount of paraffin wax is also generated.

The Fischer-Tropsch process for the conversion of fossil fuel derived syngas to liquid hydrocarbons is well known in the chemical engineering arts and exemplary descriptions of the application of the process are described in "Coal Conversion Technology" by I. Howard-Smith and G. J. Werner, pp 15–17, 29, 52–5, 58, 77 and 92, which descriptions are incorporated herein by reference. The process is particularly well known for its utilization by Germany during WW II where 10 large plants were constructed to produce hydrocarbon fuels. More recently, coal based F-T plants were constructed in South Africa by the South African Coal, Oil and Gas Corporation Ltd (SASOL) and operated long term for the production of hydrocarbon fuels and chemicals. The F-T process is carried out using iron or cobalt as a catalyst at temperatures between 425 and 700° F. and medium pressure between 300 and 800 psi.

In a preferred process of the invention, syngas is generated from coal, preferably employing one or the other of the Lurgi gasification process or the Koppers-Totzek (K-T) or similar gasification process. In the Lurgi process, a fixed bed reactor is employed using oxygen or air and steam at about 20–30 atm and temperatures ranging from 560–620° C. In the K-T process, gasification takes place at low pressures and much higher temperatures of about 1480° C. Optionally, partial oxidation processes known in the art may be employed to produce the required syngas. The product syngas is desulfurized by methods known in the art such as adsorption on activated carbon or reaction with zinc oxide. Water gas shift is no longer required. $H_2$ to $N_2$ ratio in the off-gas can be adjusted by the balancing (addition) of nitrogen.

The unconverted hydrogen and nitrogen are employed to manufacture ammonia by processes well known in the art. Commercial ammonia production is carried out using a catalytic surface based on metallic iron, typically promoted with other oxides. Operating pressures are high, generally in the range of 2,000 to 5,000 psi.

The following Examples illustrate the process of the invention and the inherent advantages of the invention over the prior art.

EXAMPLE 1

For a 300,000 MT/yr ammonia plant the flow rate of coal-derived syngas feed is 124,000 $NM^3$/hr which is used first for F-T synthesis before ammonia production. The synthesis gas has the following composition in mol percent:

| | |
|---|---|
| $H_2$ | 41.0 |
| CO | 31.0 |
| $CO_2$ | 6.3 |
| $N_2$ | 21.1 |
| $CH_4$ | 0.6 |
| Total S | 50 ppm |

The syngas is processed by desulfurization to provide a syngas with a sulfur content of <2ppm for use in the F-T synthesis. The entire syngas production is passed to a F-T unit for conversion to liquid hydrocarbon products. The CO conversion is 88 mol percent and hydrogen gas conversion is 46.8 percent. The fuel products from the F-T unit are presented as follows in metric tons per year

| | |
|---|---|
| $C_1/C_2$ | 12,210 |
| $C_3/C_4$ (LPG) | 18,781 |
| $C_5$ - 180° C. (naphtha) | 28,868 |
| 200–360° C. (diesel fuel) | 24,585 |
| >360° C. | 7,983 |
| Total $C_1$+ | 92,427 |
| Total $C_3$+ | 80,217 |
| Total $C_5$+ | 61,436 |

The plant produces liquid hydrocarbons including LPG, naphtha and diesel fuel totaling 80,217 metric tons per year in addition to fertilizer production. Most of the CO and a significant part of the hydrogen gas in the water gas or semi water gas are converted to products in the F-T reactor. The effluent gas from the F-T unit contains a small amount of unconverted CO, a large amount of unconverted hydrogen gas, and the nitrogen gas originally existent in the feed gas which is sent downstream for conversion in an existing ammonia production plant. The F-T effluent gas has a flow rate of 76,588 $NM^3$/hr comprising:

| | |
|---|---|
| $H_2$ | 27,047 |
| CO | 4,613 |
| $N_2$ | 26,164 |
| $C_1$ | 1,823 (including 744 in feed syngas) |

-continued

|  | |
|---|---|
| $C_2$ | 600 |
| $CO_2$ | 16,304 (including 781 in feed syngas) |

After recovery of $C_1$ and $C_2$ and shifting CO to $H_2$, the effluent F-T has a flow rate of 78,778 $NM^3/hr$ containing the following:

|  | $NM^3/hr$ | Mole % |
|---|---|---|
| $H_2$ | 31,660 | 40.2 |
| $N_2$ | 26,164 | 33.2 |
| $CO_2$ | 20,954 | 26.6 |

The foregoing effluent F-T gas is used to produce 16,018 kg/hr of ammonia, approximately 127,000 MT/yr, which is optionally used to produce 600,000 MT/yr of ammonium bicarbonate.

As a result of the retrofit process of the invention integrating an F-T process into a syngas-to-ammonia complex 80,000 MT/yr of liquid hydrocarbon products and 127,000 MT/yr of ammonia or 600,000 MT/yr of ammonium bicarbonate are produced.

EXAMPLE 2

In Example 2, the process of the invention is carried out as in Example 1 employing a coal-derived syngas of the following composition expressed in mol %:

|  |  |
|---|---|
| $H_2$ | 37 |
| CO | 35 |
| $CO_2$ | 7 |
| $N_2$ | 18 |
| $CH_4$ | 3 |
| Total S | 50 ppm |

The CO conversion is 88 mol percent and hydrogen gas conversion is 56.0 percent. The fuel products from the F-T unit are presented as follows in metric tons per year.

|  |  |
|---|---|
| $C_1/C_2$ | 13,500 |
| $C_3/C_4$ (LPG) | 16,860 |
| $C_5$ - 180° C. (naphtha) | 32,760 |
| 200–360° C. (diesel fuel) | 29,900 |
| >360° C. | 8,540 |
| Total $C_1$+ | 101,560 |
| Total $C_3$+ | 88,060 |
| Total $C_5$+ | 71,260 |

The F-T plant produces liquid hydrocarbons including LPG, naphtha and diesel fuel totaling 88,060 metric tons per year in addition to fertilizer production. The F-T effluent gas has a flow rate of 80,225 $NM^3/hr$ comprising:

|  |  |
|---|---|
| $H_2$ | 20,187 |
| CO | 5,208 |
| $N_2$ | 22,320 |

-continued

|  | |
|---|---|
| $C_1$ | 4,916 (including 3720 in feed syngas) |
| $C_2$ | 658 |
| $CO_2$ | 26,936 (including 8680 in feed syngas) |

After recovery of $C_1$ and $C_2$ and shifting CO to $H_2$, the effluent F-T has a flow rate of 78,859 $NM^3/hr$ containing the following:

|  | $NM^3/hr$ | Mole % |
|---|---|---|
| $H_2$ | 25,395 | 34.0 |
| $N_2$ | 22,320 | 29.9 |
| $CO_2$ | 32,144 | 36.1 |

As a result of the retrofit process of the invention of Example 2 integrating an F-T process into a syngas-to-ammonia complex, 88,000 MT/yr of liquid hydrocarbon products and 102,000 MT/yr of ammonia or 473,000 MT/yr of ammonium bicarbonate are produced.

EXAMPLE 3

The flow rate of coal-derived semi-water gas feed available for Fischer-Tropsch (F-T) synthesis is 40,000 $NM^3/hr$ with the following composition (mol%)

|  |  |
|---|---|
| $H_2$ | 44.00 |
| CO | 30.00 |
| $CO_2$ | 8.00 |
| $N_2$ | 16.50 |
| $CH_4$ | 1.00 |
| $O_2$ | 0.50 |

Conversion (mol %)

|  |  |
|---|---|
| CO Conversion | 90.0 |
| $H_2$ | 48.6 |

Fuel Products Projected from F-T Unit (Metric Tons/yr)

|  |  |
|---|---|
| C | 3,080 |
| $C_2$[1] | 2,669 |
| $C_3/C_4$[2](LPG) | 8,122 |
| $C_5$-200° C. (naphta) | 11,643 |
| 200–360° C. (diesel fuel) | 5,700 |
| >360° C. | 3,000 |
| Total C1+ | 34,214 |
| Total C3+ | 28,465 |

[1] $C_2^=/C_2^0$~2:1
[2] $C_3^=/C_3^0$~3:1, $C_4^=/C_4^0$~2.5

Effluent-Gas from F-T Unit

F-T effluent gas will have a flowrate of 25,193 $NM^3/hr$ containing:

| | |
|---|---|
| $H_2$ | 9,046 |
| CO | 1,200 |
| $C_1$ | 945 (including 400 in semi-water gas) |
| $C_2$ | 260 |
| $CO_2$ | 7,142 |
| $N_2$ | 6,600 (existent in feed gas) |

After removal of $C_1$ and $C_2$ and shifting CO to $H_2$, the effluent gas has a flow rate of 25,188 $NM^3/hr$ containing the following:

| | $NM^3/hr$ | Mol % |
|---|---|---|
| $H_2$ | 10,246 | 40.7 |
| $N_2$ | 6,600 | 26.2 |
| $CO_2$ | 8,342 | 33.1 |

This gas can be used to produce theoretically ammonia 5,185 kg/hr (~41,000 MT/yr), which in turn can be used to make ammonium bicarbonate 24,100 kg/hr (~191,000 MT/yr).

EXAMPLE 4

Feed Gas to FT Unit
Coal-derived Syngas

| | Case 1 | Case 2 |
|---|---|---|
| Flow rate, $NM^3/hr$ | 18,434 | 17,560 |
| Composition, mol % | | |
| $H_2$ | 58.10 | 44.31 |
| CO | 41.50 | 55.24 |
| $N_2$ | 0.40 | 0.45 |
| $H_2/CO$ | 1.40 | 0.80 |
| Conversion, mol % | | |
| CO | 88.0 | 88.0 |
| $H_2$ | 53.0 | 67.0 |

Hydrocarbon Products (Metric tons/yr)

| | | |
|---|---|---|
| C1/C2 | 3,149 | 3,512 |
| C3/C4 (LPG) | 4,198 | 5,017 |
| C5-180° C. (naphtha) | 8,035 | 9,627 |
| 180–360° C. (diesel fuel) | 8,635 | 10,343 |
| Paraffin wax | 1,614 | 1,940 |

Effluent Gas From FT Unit Containing ($NM3/hr$)

| | | |
|---|---|---|
| $H^2$ | 5,034 | 2,568 |
| CO | 918 | 1,164 |

Potential Ammonia Production (Metric tons/yr)

| | | |
|---|---|---|
| $NH^3$ | 53,664 | 33,648 |

EXAMPLE 5

Feed gas: Natural gas—Derived Syngas
Flow rate of Synthesis Gas (syngas) is 20,000 $NM^3/hr$
Syngas Composition (mol %)

| | |
|---|---|
| $H_2$ | 76.00 |
| CO | 18.71 |
| $CO_2$ | 5.09 |
| $CH_4$ | 0.20 |
| Total S | <1 ppm |

Conversion in FT Reactor (mol %)

| | |
|---|---|
| CO Conversion | 92.0 |
| $H_2$ | 33.0 |

Fuel Products Projected from F-T Unit (Metric Tons/yr)

| | |
|---|---|
| $C_1$ | 698 |
| $C_2{}^1$ | 1450 |
| $C_3/C_4{}^2$ (LPG) | 2950 |
| $C_5$-190° C. (naphtha) | 3075 |
| 190–290° C. | 1470 |
| >290° C. (diesel fuel) | 1530 |
| Total $C_1+$ | 11,173 |
| Total $C_3+$ | 9,025 |

$^1 C_2{}^-/C_2{}^0 \sim 2:1$
$^2 C_3{}^-/C_3{}^0 \sim 3:1, C_4{}^-/C_4{}^0 \sim 2.5$
$^3 C_5$-190° C. fraction contains alpha-olefins - 40%
$^4 190 . 290°$ C. fraction containing alpha-olefins ~50%

Effluent-Gas from F-T Unit

F-T effluent gas will have a flowrate of 13,873 NM3/hr containing:

| | |
|---|---|
| He | 10,184 |
| CO | 299 |
| $C_1$ | 123 |
| $C_2$ | 153 |
| $CO_2$ | 2,365 |
| $H_2O$ | 749 |

Ammonia Production Expected

The amount of hydrogen in the off-gas can be utilized to produce ammonia, with appropriate addition of nitrogen, 91,820 metric tons per year.

EXAMPLE 6

Basic Data

Flow rate of natural gas-derived synthesis gas (syngas) generated from a steam reformer and desulfurized being sent to FT unit is 20,000 $NM^3/hr$:

Syngas Composition (mol %)

| | |
|---|---|
| $H_2$ | 62.96 |
| CO | 32.75 |
| $CO_2$ | 1.30 |
| $CH_4$ | 2.99 |
| Total S | <1 ppm |

Conversion in FT Reactor (mol %)

| | |
|---|---|
| CO Conversion | 92 |
| $H_2$ | 40 |

Fuel Products Produced from F-T Unit (Metric Tons/yr)

| | |
|---|---|
| $C_1$ | 1660 |
| $C_2^=$ | 992 |
| $C_2^o$ | 470 |
| $C_3^=$ | 1733 |
| $C_3^o$ | 524 |
| $C_4^=$ | 1263 |
| $C_4^o$ | 397 |
| C5-190° C. (naphtha) | 5571 |
| 190–290° C. | 2664 |
| >290° C. (diesel fuel) | 2774 |
| Total $C_1+$ | 18050 |
| Total $C_2+$ | 16390 |
| Total $C_3+$ | 14928 |

C5-190° C. fraction contains alpha-olefins ~50%
190–290° C. fraction contains alpha-olefins ~60%

Effluent-Gas from F-T Unit

F-T reactor effluent gas will have a flow rate of 10,750 $NM^3$/hr ($C_1$, $C_2$, $H_2O$ discounted) containing:

| | |
|---|---|
| $H_2$ | 7,555 |
| CO | 524 |
| $CO_2$ | 2,670 |

Further Utilization of Unconverted Hydrogen

Hydrogen in the off-gas can be utilized, with proper addition of nitrogen, to produce ammonia 72,840 metric tons per year.

EXAMPLE 7

Basic Data

Flow rate of natural gas-derived synthesis gas (syngas) generated from a steam reformer and desulfurized being sent to FT unit is 20,000 NM3/hr, with following composition (mol %)

| | |
|---|---|
| $H_2$ | 47.00 |
| CO | 47.00 |
| $CO_2$ | 2.00 |
| $CH_4$ | 4.00 |
| Total S | <1 ppm |

Conversion in FT Reactor (mol %)

| | |
|---|---|
| CO Conversion | 92 |
| $H_2$ | 58 |

Fuel Products Produced from F-T Unit (Metric Tons/yr)

| | |
|---|---|
| $C_1$ | 1942 (does not include C1 in feed syngas) |
| $C_2^=$ | 971 |
| $C_2^o$ | 715 |
| $C_3^=$ | 1892 |
| $C_3^o$ | 512 |
| $C_4^=$ | 1175 |
| $C_4^o$ | 409 |
| C5-190° C. (naphtha) | 7789 |
| 190–290° C. | 4600 |
| >290° C. (diesel fuel) | 3917 |
| Total $C_1+$ | 23,922 |
| Total $C_2+$ | 21980 |

C5-190° C. fraction contains alpha-olefins ~56%
190–290° C. fraction contains alpha-olefins ~50%

Effluent-Gas from F-T Unit

F-T reactor effluent gas has a flowrate of 8,818 $NM^3$/hr ($C_1$, $C_2$, $H_2O$ discounted) containing:

| | |
|---|---|
| $H_2$ | 3,948 |
| CO | 752 |
| $CO_2$ | 4,118 |

Further Utilization of Unconverted Hydrogen

The unconverted hydrogen in the reactor off-gas can be further utilized in ammonia production with addition of necessary nitrogen at 42,380 metric tons per year.

EXAMPLE 8

Basic Data Natural Gas—Derived Syngas

Flow rate: 2,000 kg-mol/hr or 45,000 NM3/hr
Composition (mol %)

| | |
|---|---|
| $H_2$ | 52.17 |
| CO | 37.27 |
| $CO_2$ | 8.66 |
| $CH_4$ | 1.35 |
| N2 | 0.38 |
| H2O | 0.17 |
| Total S | <1 ppm |

Conversion in FT Reactor (mol %)

| | |
|---|---|
| CO Conversion | 88.0 |
| $H_2$ | 44.6 |

Fuel Products from F-T Unit (Metric Tons/yr)

| | |
|---|---|
| $C_1$—$C_2$ | 11,316* |
| $C_3$—$C_5$ | 13,197 |
| $C_6$—$C_9$ | 11,845 |
| $C_{10}$—$C_{14}$ | 5,447 |
| $C_{15}$+ | 5,465 |
| Total $C_1$+ | 47,270 |
| Total $C_3$+ | 35,954 |

*Including $C_1$ in feed syngas 3439 MT/yr

Unconverted $H_2$, CO and by-product in FT off-gas (NM3/hr)

| | |
|---|---|
| $H_2$ | 13,006 |
| CO | 2,013 |
| $CO_2$** | 5,904 |

**excluding $CO_2$ in feed gas 3897 NM3/hr

Ammonia Production—52,120 metric ton/yr, utilizing hydrogen in off-gas. $CO_2$ can be used in Ammonium bicarbonate production.

EXAMPLE 9

Basic Data Syngas is Generated by Steam Reforming of Refinery Dry Gas

| | |
|---|---|
| Syngas Flow rate: | 10,000 NM³/hr |
| Syngas Composition (mol %) | |
| $H_2$ | 72.65 |
| CO | 14.06 |
| $CO_2$ | 12.78 |
| $CH_4$ | 0.51 |
| Total S | ≦0.5 ppm |

Conversion in FT Reactor (mol %)

| | |
|---|---|
| CO Conversion | 92.0 |
| $H_2$ | 26.2 |

Fuel Products from F-T Unit (Metric Tonslyr)

| | |
|---|---|
| $C_1$ | 303 |
| $C_2$s[1] | 675 |
| $C_3$/$C_4$[2](LPG) | 1370 |
| $C_5$-177° C.[3] | 1341 |
| 177–360° C. | 1250 |
| >360° C. | 232 |

[1] $C_2$=/$C_2$0~2:1
[2] $C_3$=/$C_4$0~2.5
[3] $C_5$—$C_{15}$ fraction contains alpha-olefins ~40 m%

Effluent-Gas from F-T Unit

| | |
|---|---|
| $H_2$ | 5,362 |
| CO | 113 |
| $CH_4$ | 105 |
| $CO_2$ | 1,559 |
| $H_2O$ | 731 |

F-T effluent gas has a flowrate of 7,870 NM³/hr containing:

After removal of $CO_2$ and $H_2O$, the effluent gas has a flow rate of 5,580 NM3/hr and the following composition (mol %)

| | |
|---|---|
| $H_2$ | 96.1 |
| CO | 2.0 |
| $CH_4$ | 1.9 |

Hydrogen in the off-gas can be utilized, with addition of necessary amount of nitrogen, to produce ammonia at 48,344 metric tons per year.

What is claimed is:

1. An integrated process for the production of ammonia-based fertilizer and liquid hydrocarbon products from fossil fuel derived synthesis gas, said process comprising:

contacting said fossil fuel with steam and oxygen-containing gas under partial oxidation conditions sufficient to produce a synthesis gas;

passing said synthesis gas comprising nitrogen gas, hydrogen gas and carbon monoxide in a mole ratio of hydrogen to carbon monoxide of between 0.8 to 1 and 5.2 to 1 to a catalytic synthesis gas conversion process under Fischer-Tropsch synthesis conditions for the conversion of the carbon monoxide gas and a portion of the hydrogen gas to fuel products comprising substantially liquid hydrocarbon products and light hydrocarbon gaseous products, wherein said conversion is carried out predominantly in the absence of a water gas shift reactor suitable for the conversion of CO to hydrogen;

separating the liquid and gaseous hydrocarbon products from the nitrogen gas and the unreacted portion of the hydrogen gas while recovering the hydrocarbon products;

passing the nitrogen gas and the unreacted hydrogen gas as a feedstream to a process for the hydrogenation of the nitrogen whereby ammonia-based fertilizer is produced and recovered.

2. The process of claim 1 wherein syngas comprises desulfurized syngas having a sulfur content of less than 2 ppm.

3. The process of claim 1 wherein said fossil fuel comprises coal.

4. The process of claim 1 wherein said fossil fuel comprises natural gas.

5. The process of claim 1 wherein said fossil fuel comprises refinery dry gas.

6. The process of claim 1 wherein the catalytic process for the conversion of hydrogen gas and carbon monoxide to liquid and gaseous hydrocarbon products comprises the Fischer-Tropsch process.

7. The process of claim 1 wherein the mole ratio of hydrogen gas to carbon monoxide gas is between 1.0 to 1.1 and 2.1.

8. The process of claim 1 wherein the hydrocarbon synthesis conditions comprise temperature between 300° F. and 510° F. and pressure between 250 to 800 psi.

9. The process of claim 1 wherein said fossil fuel partial oxidation conditions include temperatures from 200° F. to 3,500° F. and pressure from atmospheric to 3,000 psi.

10. The process of claim 1 wherein said nitrogen hydrogenation process is a catalytic hydrogenation process.

\* \* \* \* \*